United States Patent [19]

Sugisawa et al.

[11] Patent Number: 4,761,297

[45] Date of Patent: Aug. 2, 1988

[54] METHOD OF MANUFACTURING DRIED RICE

[75] Inventors: Ko Sugisawa; Masaru Shibuki, both of Nara; Noriaki Yamaguchi, Jyoyo; Maki Nakano, Takatsuki, all of Japan

[73] Assignee: House Food Industrial Company Limited, Higashiosaka, Japan

[21] Appl. No.: 936,153

[22] Filed: Dec. 1, 1986

[30] Foreign Application Priority Data

Dec. 6, 1985 [JP] Japan .................... 60-274786

[51] Int. Cl.⁴ .................. A23L 1/00; A23L 1/182
[52] U.S. Cl. .................... 426/618; 426/456; 426/459; 426/462; 426/309; 426/509; 426/426
[58] Field of Search .......... 426/459, 462, 456, 309, 426/618, 509, 426

[56] References Cited

U.S. PATENT DOCUMENTS

| | | | |
|---|---|---|---|
| 2,278,465 | 4/1942 | Musher | 426/309 |
| 2,898,214 | 8/1959 | Ferrel | 426/309 |
| 3,157,514 | 11/1964 | Gorozpe | 426/508 |
| 3,655,400 | 4/1972 | Csiri et al. | 426/618 |
| 3,745,019 | 7/1973 | Huxsoll et al. | 426/439 |
| 4,640,842 | 2/1987 | May | 426/650 |

FOREIGN PATENT DOCUMENTS

| | | | |
|---|---|---|---|
| 238909 | 2/1960 | Australia | 426/309 |
| 495512 | 1/1977 | Australia | 426/618 |
| 0005147 | 1/1983 | Japan | 426/618 |
| 519926 | 4/1940 | United Kingdom . | |
| 2069812 | 11/1981 | United Kingdom . | |

*Primary Examiner*—Donald E. Czaja
*Assistant Examiner*—Mary S. Mims
*Attorney, Agent, or Firm*—Oblon, Fisher, Spivak, McClelland & Maier

[57] ABSTRACT

The present invention provides a method of manufacturing dried rice, which is capable of allowing the cooking time to be reduced, and which allows the rice to have an appearance and a texture when cooked as excellent as rice cooked using an electric rice cooker. The method of manufacturing dried rice comprises as steps of: adjusting a water content of polished rice so that it reaches at least 23 wt % after the rice has been washed with water; soaking the rice in a sugar solution so as to allow the sugar to permeate the rice and to remove 6 to 38 wt % of the water contained in the rice; separating the sugar solution adhered to the rice; and drying the rice under conditions in which starch contained therein will not be pregelatinized.

9 Claims, No Drawings

METHOD OF MANUFACTURING DRIED RICE

BACKGROUND OF THE INVENTION

(1) Field of the Invention

The present invention relates to a method of manufacturing dried rice. More specifically, the present invention is directed to a method of manufacturing dried rice which, in comparison with the conventional rice, need not be washed with water or soaked in water before being cooked, which is capable of allowing the cooking time to be reduced, and which allows the rice to have an appearance and a texture when cooked as excellent as rice cooked using an electric rice cooker.

(2) Prior Art

Development of the electric rice cooker has reduced the time required for cooking rice and has simplified the cooking procedure. However, there has been in increasing demand for methods of cooking rice in even simpler ways and in even shorter times, and various methods have accordingly been developed. Japanese Patent Laid-Open (KOKAI) No. 141257/1982, for example, proposes a method of making vacuum packed rice, in which polished rice washed with water is dehydrated and dried, and is then vacuum packed when the water content thereof has reached a predetermined value above that of the ordinary rice. However, dried rice made in this manner remains hard when cooked for about 15 minutes, and does not become at all fluffy. Apart from vacuum packing, a method of preparing dried rice with a pregelatinized starch content has also been developed, and examples of this method include Japanese Patent Laid-Open (KOKAI) No. 85258/1974 and Japanese Patent Publication No. 1964/1965. The former involves the drying of rice with a pregelatinized starch content after it has absorbed at least one type of basic amino-acid and at least one type of sugar alcohol. The latter discloses a method of manufacturing quick-cooking rice in which rice is soaked in water to which a retrogradation accelerator such as starch decomposing enzyme, polymerized phosphate, sorbitol or surface-active agent has been added, is steamed or boiled and then fried to pregelatinize the starch contained in the rice. The dried rice prepared by either of these methods can be made edible in a relatively short period of time by pouring hot water over it, and the rice has no core when cooked. However, since the starch in the rice has been pregelatinized beforehand, it is an inherent problem with such rice that when it is cooked, the texture thereof becomes too soft as compared with the cooked polished rice. In addition, when cooked, the rice prepared in either of the above methods lacks the special aroma inherent to well cooked rice. On the other hand, Japanese Patent Publication No. 31942/1977 describes a method of preparing modified rice by adding to polished rice a modifier consisting of 0.5 to 20% of rice bran oil, 3 to 30% of sorbitol, 0.05 to 5% of emulsifier and the balance water, in an amount between 0.5 and 2% by weight relative to the weight of the polished rice. In this method, since rice starch is not pregelatinized in preparation of modified polished rice, the rice has a good texture when cooked. However, this method does not allow the cooking time to be reduced sufficiently.

SUMMARY OF THE INVENTION

The present invention is based on the knowledge that the above-described problems can be effectively solved by allowing the polished rice to contain at least a predetermined water content and thereby causing the grains of rice to swell, by impregnating the grains of rice with sugar solution and removing a specific amount of the water contained in the grains of rice utilizing the dehydrating action of the sugar solution, and by drying the rice under specific conditions.

It is, therefore, a primary object of the present invention to provide, without employing rice with a pregelatinized starch content, a method of manufacturing dried rice which need not be washed with water or soaked in water before being cooked, and which is capable of allowing the cooking time to be reduced. Another object of the present invention is to provide a method of manufacturing dried rice which can be made edible easily and in a short period of time, and which allows it to have a texture when cooked as excellent as cooked polished rice. These and other object of the present invention will be clean from the following description.

In accordance with the present invention, there is provided a method of manufacturing dried rice which comprises the steps of: adjusting the water content of polished rice so that it reaches at least 23 wt% after the rice has been washed with water; soaking the rice in a sugar solution so as to allow the sugar to permeate the rice and to remove 6 to 38 wt% of the water contained in the rice; separating the sugar solution adhered to the rice; and drying the rice under conditions in which the starch contained therein will not be pregelatinized.

DESCRIPTION OF THE PREFERRED EMBODIMENTS

All types of polished rice including no matter where produced and hard and soft rices can be trated in the present invention. New rice, long-stored rice, nonglutinous rice and glutinous rice can also be employed. When the employed rice is of glutinous type, it is possible to obtain dried rice that could be made edible in about 10 minutes.

In the present invention, after any of the abovementioned types of polished rice (in general such types of rice contain 13 to 16 wt% of water) has been washed with water, the water content of the grains of rice is adjusted so that it becomes at least 23 wt% (hereinafter referred to as %). This adjusting operation is necessary to allow the water to permeate the interior of each grain of rice, so that this water may be replaced by the sugar solution when the rice is soaked therein in the subsequent process, whereby the sugar solution is caused to permeate the interior of the rice. This adjustment of the water content of the rice is performed by soaking the polished rice in water. In a practical application, the rice is soaked in water having a temperature of 25° C. for more than 30 minutes, preferably for 50 to 70 minutes, whereby the water content of the grains of rice is adjusted to be at 23% or above, preferably 28% or above, and more preferably between 28 and 35%. The higher the temperature of the soaking water, the shorter the time required to set the water content of the rice at any given value. A suitable temperature for the water may therefore be between 15° and 60° C., at which temperature the starch content is not pregelatinized. In the present invention, it is necessary to adjust the water content of the grains of polished rice at a given value in the particular range after the washing of the rice with water, since when the rice is soaked in sugar solution having a low concentration without adjustment of the water thereof, it is difficult to impregnate the rice with a sufficient amount of sugar, although the sugar will to some extent permeate the rice. On the other hand, with sugar solution of high concentration, no permeation will occur at that time. In addition, it is possible to color or season the rice by employing various seasonings at the time of adjusting the water content.

Subsequently, the grains of rice with a water content adjusted in the above range is soaked in a sugar solution to impregnate the rice with sugar and simultaneously the water content of the rice is dehydrated by 6 to 38%. Sugar solutions that can be employed include a solution of sorbitol, mannit, sucrose, or glucose, and a liquid containing starch hydrolyzate, called liquid sugar, Among these, a solution of sorbitol is preferable, since the rice does not become sweet when soaked therein, and since it permeates faster. Soaking of the rice in the sugar solution is performed in the present invention to dehydrate the grains of rice efficiently without generating cracks therein and to thereby impregnate the interior of the grains of rice with sugar, whereby the need for an operation of soaking rice in water is eliminated at the time of cooking and the time required for cooking is reduced. Thus, 3 to 9% of sugar is impregnated in the grains of rice, and simultaneously 6 to 38. preferably 12 to 35%, of the water contained in the rice which has been soaked in water is removed. If the amount of water removed is less than 6%, a large amount of water must be dried in the subsequent drying process, generating cracks. If the amount of water removed exceeds 38%, the rice will become too sweet when cooked, degrading the taste of the cooked rice.

Concentration of the sugar solution employed in the present invention can be set at any value. However, in the case of sorbitol, it is preferable to employ a solution having a concentration of 20 to 70%. A solution of a higher concentration (30 or above) is preferable, since the higher the concentration is, the shorter the time required to remove the large amount of water absorbed during soaking. A supersaturated solution may also be employed. Thus, the grains of rice are soaked in a sugar solution having a concentration in the above-mentioned range and a temperature of 15° to 60° C. for 10 to 120 minutes, preferably for 60 to 120 minutes. If a solution of sucrose or glucose is employed, it is desirable to use a saturated aqueous solution with a view to reducing the time required for soaking.

After the grains of rice have been soaked in the sugar solution, the sugar solution adhered to the rice is separated therefrom. Any separation method may be used including centrifugal separation so long as it ensures an effective separation of the sugar solution adhered to the surface of the rice. Preferably, solution separation is conducted to such a degree that it takes the gloss off the surface of the rice grains. Removal of sugar solution from the grains of rice is performed in the purposes of preventing the rice from becoming too sweet, for increasing the drying efficiency during the drying process and for taking the gloss off the surface of the rice, thereby improving the appearance thereof.

Subsequently, the grains of rice are dried under conditions wherein the starch content will not be pregelatinized. In a practical operation, they are dried at a relatively low temperature and at high humidity for a long period of time, since in this way generation of cracks on the grains of rice can be prevented as much as possible. Preferably, hot-air drying incorporating a fan, or constant-humidity constant-temperature drying is adopted. Drying is conducted under the following conditions:

Temperature: Between 10° and 75° C., preferably between 15° and 50° C.,

Humidity: Between 50 and 90% RH preferably between 60 and 85% RH,

Time: Between 2 and 24 hours, preferably between 4 and 15 hours,

By drying the rice under these conditions, the water content thereof is finally adjusted to be between 10 and 15.5%. If it is less than 10%, it takes too much time to cook the thus-obtained dried rice. If the water content exceeds 15.5%, the rice is subject to molding during the storage thereof, making it impossible for the rice to be preserved for a long time.

The principle of the present invention is to treat polished rice in the above-described processes. However, the rice may be seasoned by using a solution of salt, Japanese Sake or seasonings, or may be colored by using saffron or the like during the soaking of the rice in water. The rice may have separately dried ingredients or powdered seasonings added thereto during the packing thereof after it has been dried.

The present invention makes it possible to manufacture dried rice which need not be washed with water or soaked in water (generally soaking for 30 minutes or above is required), and which can be made edible in a very short period of time. By using the dried rice manufactured in accordance with the present invention, it is possible to reduce the time required for cooking the rice from 25 minutes or above to about 15 minutes, as well as to eliminate the hard core from the cooked rice and to give a good texture thereto. Further, the dried rice manufactured in accordance with the present invention can be stored for a long period of time. It has no cracks therein, and therefore looks attractive.

Although the dried rice of the present invention may be made edible using an ordinary electric rice cooker, it can be easily cooked by package cooking (in which the rice is packed in a bag having a large number of small openings, and is cooked in that state by placing the bag in boiling water).

The present invention will be described hereinunder by the following non-limitative example.

EXAMPLE

After 100 g of polished rice with a water content of 15% had been washed with water, it was soaked in water having a temperature of 20° C. for 1 hour. Water adhered to the surface of the rice was then removed so as to obtain rice with a water content of 30%. The rice was then soaked in 200 g of 70% sorbitol solution at a temperature of 20° C. for 90 minutes to replace the water contained in the rice with the sorbitol solution. The sorbitol solution adhered to the surface of the rice was removed using a centrifugal separator (of basket type), thereby providing dehydrated rice with a water content of 20% (dehydration was conducted at a rate of 33.3%.

Subsequently, the rice was dried for 8 hours at a temperature of 40° C. and at a humidity of 80% RH to obtain dried rice in accordance with the present invention (Sample A). The water content of the thus-obtained rice was 15%, while the sorbitol content was 8.2%.

COMPARATIVE EXAMPLE 1

Dried rice with a water content of 15% (Sample B) was obtained in the same manner as Example with the exception that soaking in sorbitol was not performed and that the rice was dried for 10 hours.

the rice, draining the water after 5 minutes, then steaming the cooked rice for 5 minutes.

| Item | Appearance (before cooking) | | Taste | |
|---|---|---|---|---|
| Sample | Cracking | Brittleness | Hardness of center | Texture |
| A | Very few cracks | Hard to break | — | Fluffy and good |
| B | Many cracks | Very easily broken | + | Hard |
| C | No cracking | Hard to break | + | Hard |
| D | Many cracks | Easily broken | ± | Slightly hard |
| E | Very few cracks | Hard to break | + | Hard |
| F | Yes | Easily broken | — | Lacks stickiness and too soft, lacks the special aroma of cooked rice |
| Control | No | Hard to break | — | Fluffy and good |

*Sample A is that of the invention, while the others are comparison examples.

COMPARATIVE EXAMPLE 2

Polished rice similar to that employed in Example was soaked in 200 g of 70% sorbitol solution for 90 minutes without being soaked in water beforehand, and the water was then drained to obtain dried rice with a water content of 15% (Sample C). Drying was not performed in this Comparative Example.

COMPARATIVE EXAMPLE 3

Dried rice with a water content of 15% (Sample D) was obtained in the same manner as Example with the exception that the polished rice, after being washed with water, was soaked in a 10% sorbitol solution and that the water was centrifugally separated to prepare dehydrated rice with a water content of 29% (dehydration rate . . . 3.3%)

COMPARATIVE EXAMPLE 4

Dried rice with a water content of 14.8% (Sample E) was obtained in the same manner as Example, with the exception that the polished rice was soaked in water for 10 minutes so that the water content thereof was adjusted to be at 22% and the rice was then soaked in sorbitol solution to obtain rice with a water content of 18%.

COMPARATIVE EXAMPLE 5

Rice cooked in the same manner as that in Control (to be described later), but which was not allowed to steam, was dried with hot air at 80° C. for 30 minutes to obtain dried rice with a pregelatinized starch content and water content of 10% (Sample F).

Table 1 shows the results of comparison between the tastes of the above samples, each sample being prepared by packing 40 g of it in a 7×8 cm heat-resistant bag having small openings, and by cooking the bag in boiling water for 15 minutes.

Control was prepared by soaking 1.4 kg of polished rice in water for 1 hour after washing with water, cooking it for 30 minutes using an electric rice cooker and by steaming the boiled rice for 10 minutes. Sample F was prepared by pouring hot water into the bag containing The state of the center was evaluated by the following criteria:

− . . . The center is not hard.
± . . . The center is slightly hard.
+ . . . The center is hard.

Thus, according to the present invention, it is possible to obtain very good dried rice.

What is claimed is:

1. A method of manufacturing dried rice consisting essentially the steps of: adjusting the water content of polished rice so that it reaches at least 23 wt% after the rice has been washed with water; soaking the rice in a sugar solution consisting essentially of a sugar and water so as to allow the sugar to permeate the rice and to remove 6 to 38 wt% of the water contained in the rice; separating the sugar solution adhered to the rice; and drying the rice under conditions in which starch contained therein will not be pregelatinized.

2. A method as set forth in claim 1, wherein the water content of the polished rice is 13 to 16 wt% before it is washed with water.

3. A method as set forth in claim 1, wherein the water content of the polished rice is adjusted so that it reaches 28 to 35 wt% after the rice has been washed with water.

4. A method as set forth in claim 1, wherein the sugar solution is an aqueous solution containing at least one sugar selected from the group consisting of sorbitol, mannit, sucrose, glucose and liquid sugar.

5. A method as set forth in claim 1, wherein the sugar is permeated in the rice in an amount of 3 to 9 wt% by soaking the rice in a sugar solution.

6. A method as set forth in claim 1, wherein 12 to 35 wt% of the water contained in the rice is removed therefrom by soaking the rice in a sugar solution.

7. A method as set forth in claim 1, wherein the rice is soaked in a sugar solution at a temperature of 15° to 60° C. for 10 to 120 minutes.

8. A method as set forth in claim 1, wherein the rice is dried at a temperature of 10° to 75° C., 50 to 90% RH for 2 to 24 hours.

9. A method as set forth in claim 1, wherein the rice is dried so that the water content of the rice reaches 10 to 15.5 wt%.

* * * * *